United States Patent
Ourabah et al.

(10) Patent No.: US 10,668,824 B2
(45) Date of Patent: Jun. 2, 2020

(54) METHOD FOR CALCULATING A SETPOINT FOR MANAGING THE FUEL AND ELECTRICITY CONSUMPTION OF A HYBRID MOTOR VEHICLE

(71) Applicant: RENAULT s.a.s, Boulogne-Billancourt (FR)

(72) Inventors: Abdel-Djalil Ourabah, Paris (FR); Xavier Jaffrezic, Guyancourt (FR); Atef Gayed, Marly la Ville (FR); Benjamin Quost, Compiegne (FR); Thierry Denoeux, Compiegne (FR)

(73) Assignee: RENAULT s.a.s, Boulogne-Billancourt (FR)

( * ) Notice: Subject to any disclaimer, the term of this patent is extended or adjusted under 35 U.S.C. 154(b) by 0 days.

(21) Appl. No.: 15/740,887

(22) PCT Filed: Jun. 15, 2016

(86) PCT No.: PCT/FR2016/051444
§ 371 (c)(1),
(2) Date: Apr. 9, 2018

(87) PCT Pub. No.: WO2017/001740
PCT Pub. Date: Jan. 5, 2017

(65) Prior Publication Data
US 2018/0281620 A1    Oct. 4, 2018

(30) Foreign Application Priority Data

Jul. 2, 2015 (FR) .................... 15 56271

(51) Int. Cl.
*B60W 20/12* (2016.01)
*B60L 15/20* (2006.01)
(Continued)

(52) U.S. Cl.
CPC ............. *B60L 15/2045* (2013.01); *B60L 3/12* (2013.01); *B60L 50/16* (2019.02); *B60L 58/12* (2019.02);
(Continued)

(58) Field of Classification Search
CPC combination set(s) only.
See application file for complete search history.

(56) References Cited

U.S. PATENT DOCUMENTS

| 5,627,752 A | * | 5/1997 | Buck | .................... B60K 26/021 180/65.8 |
| 2008/0319595 A1 | * | 12/2008 | Yamamoto | .......... B60L 15/2045 701/22 |

(Continued)

FOREIGN PATENT DOCUMENTS

| FR | 2 907 745 A1 | 5/2008 |
| FR | 2 988 674 A1 | 10/2013 |
| WO | 2015/059536 A1 | 4/2015 |

OTHER PUBLICATIONS

International Search Report dated Aug. 22, 2016, in PCT/FR2016/051444 filed Jun. 15, 2016.
(Continued)

*Primary Examiner* — Adam D Tissot
*Assistant Examiner* — Edward J Pipala
(74) *Attorney, Agent, or Firm* — Oblon, McClelland, Maier & Neustadt, L.L.P.

(57) ABSTRACT

A method that calculates a setpoint for managing the fuel and electricity consumption of a hybrid motor vehicle includes: a) acquiring, by a navigation system on board the hybrid motor vehicle, a route to be traveled; b) dividing the route into consecutive portions; c) assigning attributes that characterize each portion; d) determining, for each of the portions, a curve or a map that links each fuel consumption value of the hybrid motor vehicle over the portion to a
(Continued)

| T1 | | T2 | | T3 | | ... | TN | |
|---|---|---|---|---|---|---|---|---|
| Attribute | Value | Attribute | Value | Attribute | Value | | Attribute | Value |
| FC | 2 | FC | 3 | FC | 6 | | FC | 1 |
| SC | 5 | SC | 4 | SC | 1 | | SC | 6 |
| SL | 70 kph | SL | 60 kph | SL | 130kph | | SL | 30 km/h |
| TS | 43 kph | TS | 74 kph | TS | 97 kph | | TS | 35 km/h |
| RG | 3% | RG | -5% | RG | 0% | | RG | 0% |
| LL | 12 km | LL | 8 km | LL | 29km | | LL | 1km | charge or discharge value of the traction battery; e) determining an optimal point of each curve or map, which makes it possible to minimize the fuel consumption of the hybrid motor vehicle over the entire route and to completely discharge the traction battery by the end of the route; and f) producing an energy management setpoint in accordance with the coordinates of the optimal points.

13 Claims, 6 Drawing Sheets

(51) Int. Cl.
*B60L 3/12* (2006.01)
*B60W 10/06* (2006.01)
*B60W 10/08* (2006.01)
*B60W 10/26* (2006.01)
*B60L 58/13* (2019.01)
*B60L 50/16* (2019.01)
*B60L 58/12* (2019.01)
*B60W 50/00* (2006.01)

(52) U.S. Cl.
CPC ............ *B60L 58/13* (2019.02); *B60W 10/06* (2013.01); *B60W 10/08* (2013.01); *B60W 10/26* (2013.01); *B60W 20/12* (2016.01); *B60L 2240/12* (2013.01); *B60L 2240/421* (2013.01); *B60L 2240/423* (2013.01); *B60L 2240/441* (2013.01); *B60L 2240/443* (2013.01); *B60L 2260/52* (2013.01); *B60L 2260/54* (2013.01); *B60W 2050/0041* (2013.01); *B60W 2552/20* (2020.02); *B60W 2556/50* (2020.02); *Y02T 10/56* (2013.01); *Y02T 10/6286* (2013.01); *Y02T 10/645* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/72* (2013.01); *Y02T 10/7283* (2013.01); *Y02T 10/84* (2013.01); *Y02T 90/161* (2013.01)

(56) References Cited

U.S. PATENT DOCUMENTS

| | | |
|---|---|---|
| 2010/0051366 A1 | 3/2010 | Junca et al. |
| 2010/0299054 A1* | 11/2010 | Hennequet ............ B60W 10/26 701/123 |
| 2011/0017534 A1* | 1/2011 | Kaltenbach .............. B60K 6/48 180/65.25 |
| 2011/0066308 A1 | 3/2011 | Yang et al. |
| 2011/0246004 A1 | 10/2011 | Mineta |
| 2013/0245870 A1 | 9/2013 | Mineta |
| 2014/0129070 A1* | 5/2014 | Lutz .................... B60L 11/1862 701/22 |
| 2015/0202990 A1* | 7/2015 | Grossard ........... B60W 50/0097 701/22 |
| 2018/0290646 A1* | 10/2018 | Graf ........................ B60L 58/12 |

OTHER PUBLICATIONS

French Search Report dated May 24, 2016 in French Application No. 15 56271 Filed Jul. 2, 2015.

* cited by examiner

| CEi \ Attributes | | $CE_1$ | $CE_2$ | $CE_3$ | $CE_4$ | ... | $CE_{11}$ |
|---|---|---|---|---|---|---|---|
| name | value | | | | | | |
| FC | 1 | | | | | | |
| | 2 | $a_1$ | $a_2$ | $a_3$ | $a_4$ | ... | $a_{11}$ |
| | ... | | | | | | |
| | 6 | | | | | | |
| SC | 1 | | | | | | |
| | 2 | | | | | | |
| | ... | | | | | | |
| | 6 | $b_1$ | $b_2$ | $b_3$ | $b_4$ | ... | $b_{11}$ |
| SL | 30 | $c_1$ | $c_2$ | $c_3$ | $c_4$ | ... | $c_{11}$ |
| | ... | | | | | | |
| | 130 | | | | | | |
| NL | 1 | | | | | | |
| | 2 | $d_1$ | $d_2$ | $d_3$ | $d_4$ | ... | $d_{11}$ |
| | $\geq 3$ | | | | | | |
| SMS | <20 | | | | | | |
| | 20-40 | | | | | | |
| | 40-60 | | | | | | |
| | 60-80 | $e_1$ | $e_2$ | $e_3$ | $e_4$ | ... | $e_{11}$ |
| | 80-100 | | | | | | |
| | >100 | | | | | | |
| TS | <20 | | | | | | |
| | 20-40 | | | | | | |
| | 40-60 | $f_1$ | $f_2$ | $f_3$ | $f_3$ | ... | $f_{11}$ |
| | 60-80 | | | | | | |
| | 80-100 | | | | | | |
| | >100 | | | | | | |

FIG. 5    TAB

METHOD FOR CALCULATING A SETPOINT FOR MANAGING THE FUEL AND ELECTRICITY CONSUMPTION OF A HYBRID MOTOR VEHICLE

TECHNICAL FIELD TO WHICH THE INVENTION IS RELATED

The present invention relates generally to rechargeable hybrid vehicles.

It relates more particularly to a calculation method for calculating a setpoint for managing the fuel and electricity consumption of a hybrid motor vehicle comprising at least one electric motor supplied with electricity by a traction battery, and an internal combustion engine supplied with fuel.

The invention finds a particularly advantageous application in long-range hybrid electric vehicles, i.e., in vehicles capable of traveling a distance greater than 10 kilometers with the aid of their electric motor alone.

TECHNOLOGICAL BACKGROUND

A rechargeable hybrid vehicle comprises a conventional combustion drivetrain (with an internal combustion engine and a fuel tank) and an electric drivetrain (with an electric motor and a traction battery notably capable of charging at a power outlet).

Such a hybrid vehicle is capable of being drawn along just by its electric drivetrain alone, or by its combustion drivetrain alone, or even simultaneously by its two electric and combustion drivetrains. It is also possible to recharge the traction battery by taking advantage of the power developed by the internal combustion engine, or also by recovering the kinetic energy developed by the motor vehicle on braking.

Due to ignorance of the vehicle's future journey, the strategy currently implemented for using one or other of the drivetrains consists in systematically beginning by discharging the traction battery at the start of the journey until reaching a level of minimum energy, then using the combustion drivetrain. In this way, when the driver makes short journeys and has regular opportunities to recharge the traction battery, they use the electric drivetrain to the maximum, which reduces the pollutant emissions of the vehicle.

This strategy does not, however, always ensure minimum fuel consumption. This is notably the case when the user begins a journey via a freeway part and ends it with a part in town. Indeed, the use of the electric drivetrain is unsuited to the freeway since the traction battery discharges very quickly thereon, and the use of the combustion drivetrain is unsuited to town since the internal combustion engine's performance is lower in town than on the freeway.

In order to overcome this drawback, document U.S. Pat. No. 8,825,243 discloses how to construct an "ideal" discharge curve of the battery on a journey prediction known to a navigation system, this curve being constructed so that the charge state of the battery reaches its minimum permissible value only at the end of the journey, then how to control the hybrid system on this journey prediction so as to best follow this discharge curve. The drawback of such a solution is that in case of significant diversity of highway conditions on the journey, e.g. the simple but very common case when starting on a first section in town, then continuing on a second freeway section and finally ending on a third section in town, then the journey is performed in a non-optimal manner from the point of view of energy consumption.

The use of the combustion drivetrain in town further proves less pleasant for the driver than that of the electric drivetrain.

Finally, legislation sometimes prevents the use of the internal combustion engine in town, so that the driver then no longer has access to town.

SUBJECT MATTER OF THE INVENTION

In order to remedy the aforementioned drawbacks of the prior art, the present invention provides for overcoming ignorance of the future journey by exploiting the data from the navigation system embedded in the vehicle.

More particularly, the invention provides a calculation method as defined in the introduction, in which provision is made for the steps of:

a) acquiring, by means of a navigation system, a journey to be made, b) dividing said journey into successive sections, c) acquiring, for each section, attributes characterizing said section, d) for each of said sections and taking into account its attributes, selecting, from among a plurality of predetermined relationships linking fuel consumption values to electrical energy consumption values, a relationship linking the fuel consumption of the hybrid motor vehicle over the section to its electrical energy consumption, e) determining an optimal point of consumption in each of the selected relationships, such that the set of optimal points minimize the fuel consumption of the hybrid motor vehicle over the entire journey and maximize the discharge of the traction battery at the end of said journey, and f) developing an energy management setpoint throughout the journey, according to the coordinates of said optimal points.

Thus, thanks to the invention, it is possible to determine at what times either the electric motor or the internal combustion engine should be used in order to best reduce the fuel consumption of the vehicle over the journey that it has to make.

By way of example, it will be possible to give priority to using the combustion drivetrain on the freeway, where its performance is best, and using the electric drivetrain in town, where its performance and its pleasantness are optimal.

It will also be possible to improve the performance of the internal combustion engine by relieving it thanks to the electric motor at the most unfavorable operating points.

Other advantageous and non-restrictive features of the calculation method in conformity with the invention are as follows:

the predetermined relationships are curves or maps linking fuel consumption values of the internal combustion engine to charge or discharge values of the traction battery;

in step d), the relationship is selected regardless of the gradient of said section, and prior to step e), provision is made for a correction step d1) for correcting said relationship taking into account said gradient;

said correction step d1) consists in shifting each point of the relationship so as to modify, at a constant charge or discharge value, the fuel consumption by a value according to the gradient;

in step d), the relationship is selected regardless of the electricity consumption of auxiliary devices which are separate from the electric motor and which are powered by the traction battery, and prior to step e), provision is made for a correction step d2) for correcting said relationship taking into account said electricity consumption of the auxiliary devices;

said correction step d2) consists in shifting each point of the relationship so as to modify, at a constant fuel consumption value, the charge or discharge by a value according to said electricity consumption of the auxiliary devices;

if, during the journey, the electricity consumption of the auxiliary devices varies substantially, steps d) and following are repeated;

a memory storing the predetermined relationships and a table associating with each attribute value a probability that the section is associated with one or other of the predetermined relationships, in step d), provision is made for each section to determine, thanks to said table, taking into account the values of the attributes associated with this section, the sum of the probabilities that the section belongs to one or other of the predetermined relationships, and to select the relationship having the highest probability sum;

since the relationships are curves, each curve is defined as a second order polynomial, for which the variations in charge and discharge of the traction battery are bounded between a minimum threshold and a maximum threshold;

said polynomial has two invariable coefficients;

in step b), each section is defined as being a portion of maximum length of the journey that comprises at least one invariable attribute throughout its length;

said invariable attribute over each section is chosen from the following list: gradient of the section, characteristic speed of vehicles over the section and category assigned to the section by the navigation system;

in step (e), the optimal consumption point of the relationship associated with each section is determined by means of an optimization algorithm.

DESCRIPTION OF THE DRAWINGS

The following description in conjunction with the appended drawings, given by way of non-restrictive examples, will elucidate the substance of the invention and how it may be implemented.

In the appended drawings.

DETAILED DESCRIPTION

Conventionally, a motor vehicle comprises a chassis which notably supports a powertrain, bodywork elements and passenger compartment elements.

In a rechargeable hybrid vehicle, the powertrain comprises a combustion drivetrain and an electric drivetrain.

The combustion drivetrain notably comprises a fuel tank and an internal combustion engine supplied with fuel by the tank.

The electric drivetrain comprises a traction battery and one or more electric motors supplied with electricity by the traction battery.

The motor vehicle here also comprises a power outlet for charging the traction battery locally, e.g. on a home power grid or any other power grid.

The motor vehicle also comprises auxiliary devices, which are here defined as electrical devices powered by the traction battery.

These auxiliary devices may include the air conditioning motor, the electric window motors, or the geolocation and navigation system.

This geolocation and navigation system conventionally comprises an antenna for receiving signals relating to the geolocalized position of the motor vehicle, a memory for storing a map of a country or a region, and a screen for illustrating the vehicle's position on this map.

Here, the case will be considered where this screen is a touch screen for allowing the driver to enter information thereon. Of course, it could be otherwise.

Finally, the geolocation and navigation system comprises a controller for calculating a journey to be made taking into account the information entered by the driver, the map stored in its memory, and the motor vehicle's position.

The motor vehicle 1 further includes an Electronic Control Unit (or ECU), here referred to as the computer, notably making it possible to control the two aforementioned drivetrains (notably the powers developed by the electric motor and by the internal combustion engine).

In the context of the present invention, this computer is connected to the controller of the geolocation and navigation system, so that these two elements may communicate information therebetween.

Here, they are connected together via the main inter-unit communication network of the vehicle (typically via the CAN bus).

The computer includes a processor and a memory unit (hereinafter referred to as the memory).

This memory records data used as part of the method described below.

It notably records a table of the type illustrated in FIG. 5 (which will be described in detail later in this disclosure).

It also records a computer application, consisting of computer programs including instructions, the execution of which by the processor allows the computer to implement the method described below.

As a preliminary, several concepts will be defined here which are used in the disclosure of the method described below.

Thus, the term "journey" may be defined as being a path that the motor vehicle has to take from a departure station to arrive at an arrival station.

This arrival station, the goal of the journey, will be considered as being provided with a charging station for recharging the traction battery via the power outlet fitted to the vehicle.

Each journey may be split into "adjacent segments" or into "adjacent sections".

The notion of segments will be that natively used by the controller fitted in the geolocation and navigation system.

In practice, each segment corresponds to a part of the journey which extends between two highway intersections. To define the shortest or the fastest journey, the controller will therefore determine via which highway segments the journey must pass.

The notion of sections is different. It will be thoroughly described in detail in the rest of this disclosure. To simplify, each section of the journey corresponds to a part of the journey over which the characteristics of the highway do not substantially evolve. By way of example, the journey could thus be split into multiple sections over each of which the speed limit is constant.

These sections are characterized by parameters here referred to as "attributes". The following are examples of attributes for characterizing each section.

A first attribute will be the "highway category FC". The controllers fitted in the geolocation and navigation systems generally use this kind of category for distinguishing the various types of highways. Here, this category may take an integer value between 1 and 6. An attribute equal to 1 may correspond to a freeway, an attribute equal to 2 may correspond to a national highway, etc.

A second attribute will be the "gradient RG" of the section, expressed in degrees or as a percentage.

The third, fourth, fifth and sixth attributes will be related to characteristic speeds of the vehicles using the section.

The third attribute will be the "speed category SC" of the section. The controllers fitted in the geolocation and navigation systems also generally use this kind of category for distinguishing the various types of highways. Here, this category may take an integer value between 1 and 6. An attribute equal to 1 may correspond to a high-speed highway (over 120 kph), an attribute equal to 2 may correspond to an expressway (between 100 and 120 kph), etc.

The fourth attribute will be the "speed limit SL" over the section.

The fifth attribute will be the "mean speed SMS" found on the section (the value of which is derived from a statistical measurement made on each highway).

The sixth attribute will be the "instantaneous speed TS" found on the section (the value of which is derived from an information system on the state of the traffic in real time).

The seventh attribute will be the "length LL" of the section. The eighth attribute will be the "mean radius of curvature LC" of the section.

The ninth attribute will be the "number of lanes NL" of the section in the direction of travel taken by the vehicle.

In the following disclosure, these nine attributes will be used to characterize each section of the journey.

As a variant, each section of the journey may be characterized by a smaller or greater number of attributes.

Moreover, the state of energy SOE of the traction battery will be defined as being a parameter for characterizing the remaining energy in this traction battery. As a variant, another parameter may be used such as the state of charge SOC of the battery or any other parameter of the same type (internal resistance of the battery, voltage at the battery terminals, etc.).

The charge or discharge $\Delta SOE$ of the traction battery will then be considered equal to the difference between two energy states considered at two different times.

The "specific consumption curve" of the vehicle is then defined on a section considered as being a curve that associates with each fuel consumption value CC of the vehicle a charge or discharge value $\Delta SOE$ of the traction battery. Indeed, over a determined section, it is possible to estimate what the vehicle's fuel consumption CC will be (in liters per kilometer traveled) and the charge or discharge $\Delta SOE$ of the traction battery (in watt-hours per kilometer). These two values will be linked by a curve, since they will vary according to whether the electric drivetrain or the combustion drivetrain is used to propel the vehicle.

Since there are an infinite number of specific consumption curves, finally the "reference curves" are defined as being particular specific consumption curves, the characteristics of which will be well known and which will make it possible to approximate each specific consumption curve. Put another way, as will appear more clearly later in this disclosure, not a specific consumption curve, but rather a reference curve (that which will be the best approximation of the specific consumption curve) will be associated with each journey section.

The method, which is implemented jointly by the controller of the geolocation and navigation system and by the vehicle's computer, is a calculation method for calculating a setpoint for managing the fuel and electricity consumption of the vehicle.

This method consists more precisely in determining how, over a predefined journey, it will be necessary to use the electric drivetrain and the combustion drivetrain in such a way as to best reduce the vehicle's fuel consumption as well as the pollutant emissions thereof.

According to one particularly advantageous feature of the invention, the method includes the following six main steps:
   acquiring a journey to be made,
   dividing said journey into successive adjacent sections $T_i$,
   acquiring, for each section $T_i$, attributes FC, SC, SL, TS, RG, LL NL, SMS characterizing this section $T_i$,
   determining, for each of the sections $T_i$, taking into account the attributes FC, SC, SL, TS, RG, LL NL, SMS of this section $T_i$, a relationship (referred to here as the reference curve $CE_j$) linking each fuel consumption value CC of the hybrid motor vehicle over the section to a charge or discharge value $\Delta SOE$ of the traction battery,
   determining an optimal point $P_i$ of each reference curve $CE_j$ for minimizing the fuel consumption of the hybrid motor vehicle over the entire journey and obtaining a complete discharge of the traction battery at the end of said journey, and
   developing an energy management setpoint according to the coordinates of said optimal points $P_i$.

These six successive steps are described in detail later in this disclosure.

The first step consists in acquiring the journey that the motor vehicle has to make.

This step may be carried out by the controller embedded in the geolocation and navigation system.

This step is then implemented conventionally.

Thus, when the driver uses the touch screen of the geolocation and navigation system for defining an arrival station, the controller of this system calculates the journey to be made, notably according to the routing parameters selected by the driver (fastest journey, shortest journey, etc.).

At this stage, it may be noted that the method must be reinitialized as soon as the vehicle makes a different journey from that defined by the geolocation and navigation system.

As a variant, this first step may be carried out differently.

Thus, it will be possible to dispense with the driver entering the arrival station on the touch screen. For this, the controller may detect the driver's habits and automatically deduce the arrival station therefrom.

For example, when the driver makes the same journey every day of the week to work, this journey may be automatically acquired without the driver having to enter any information on the touch screen of the geolocation and navigation system.

At the end of this first step, the controller embedded in the geolocation and navigation system knows the vehicle's journey, which is then composed of a plurality of adjacent segments, remembering that they each extend between two highway intersections.

The second step consists in dividing the journey into sections $T_i$.

The advantage of re-dividing the journey not into segments but into sections is firstly to reduce the number of subdivisions of the journey. Indeed, it often happens that the attributes of two successive segments are identical. If these two successive segments were processed separately, the calculation time would be multiplied pointlessly. By collecting identical segments together within the same section, it will be possible to reduce the calculation time.

Another advantage is that the characteristics of the highway over the same segment may vary substantially (one part of the segment may correspond to a highway with a zero gradient and another part of this segment may correspond to a highway with a considerable gradient). Here, the aim is to divide the journey into sections over each of which the characteristics of the highway remain homogeneous.

Each section $T_i$ will be defined here as being a portion of the journey that comprises at least one invariable attribute throughout its length.

This attribute may consist of the gradient RG and/or the speed category SC and/or the highway category FC.

Here, this step will be implemented by the controller embedded in the geolocation and navigation system. For this purpose it will split the journey into sections $T_i$ of maximum lengths over which the aforementioned three attributes (RG, SC, FC) are constant.

At the end of this second step, the controller has thus defined N sections.

The third step consists in acquiring the attributes of each section $T_i$.

When one of the attributes varies over the section considered, it is the mean value of this attribute over the entire section that will be considered.

In practice, this third step is performed in the following way.

Figure 1:
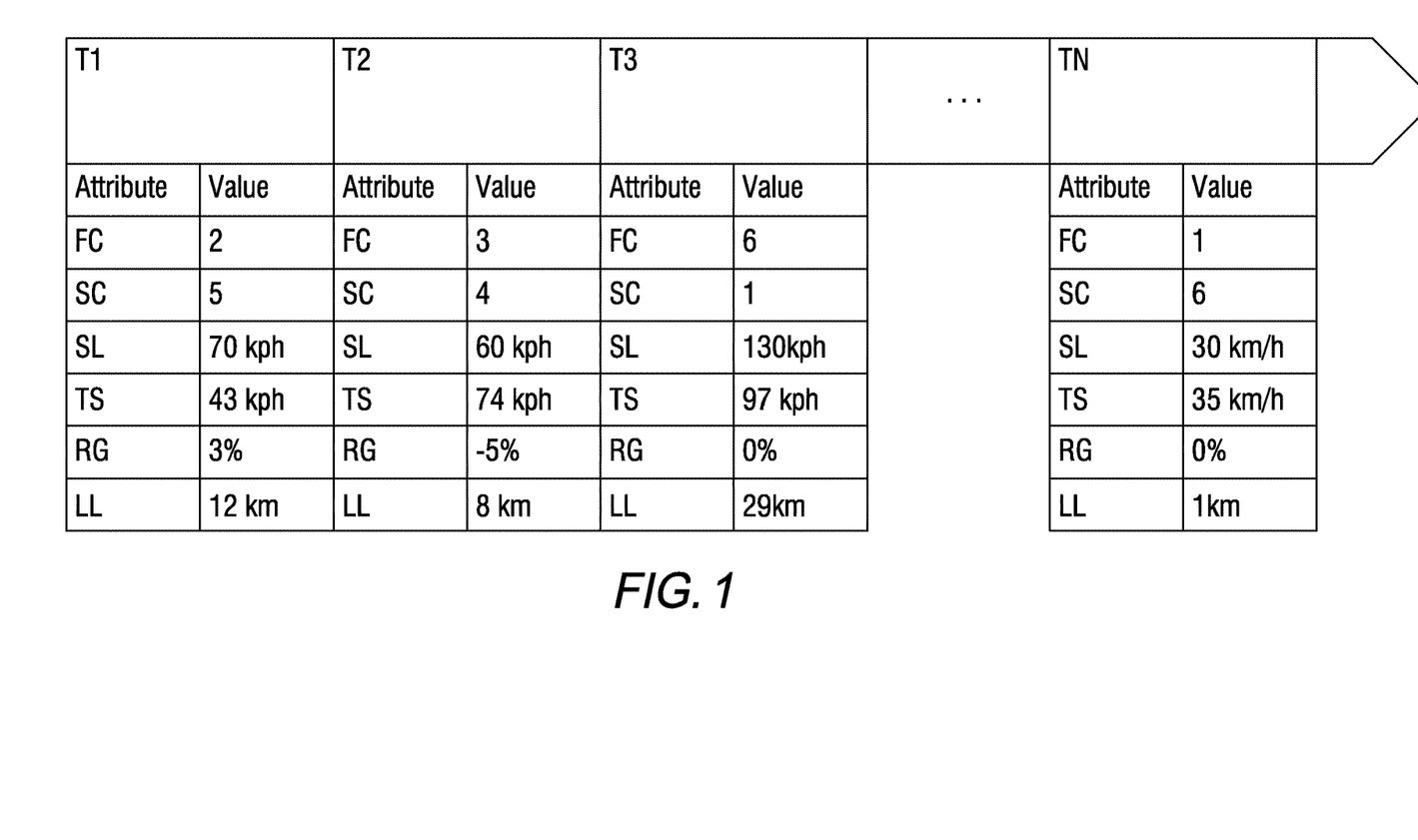
FIG. 1 is a table illustrating the attribute values characterizing sections of a journey that a vehicle has to make.

First of all, the controller embedded in the geolocation and navigation system informs the computer that a new journey has been calculated. The computer then asks for the attributes of each section to be sent, in the form, for example, of a table of the type illustrated in FIG. 1.

The controller then acquires the attributes of each section in the following way.

It calculates one part thereof, notably the length LL of the section.

It reads another part thereof in the memory of the geolocation and navigation system, notably the highway category FC, the gradient RG, the speed category SC, the speed limit SL, the mean speed SMS, the mean radius of curvature LC, and the number of lanes NL.

A last part of these attributes is communicated via another device, notably the instantaneous speed TS that the information system on the state of real-time traffic communicates thereto.

The controller then transmits all this information to the vehicle's main computer, via the CAN bus.

The advantage of using the controller embedded in the geolocation and navigation system rather than the vehicle's main computer for carrying out the first three steps lies in reducing the amount of information to be transmitted to the computer via the CAN bus. Indeed, by merging the adjacent segments of the journey that have the same attributes, the volume of the transmitted data is reduced, which speeds up data transmission via the CAN bus.

Upon receiving the information, the computer implements the following steps.

The fourth step then consists, for each of the sections $T_i$, in determining from among the reference curves $CE_j$ recorded in the memory of the computer that which will make it possible to best estimate the energy consumption (in fuel and in current) of the vehicle over the section $T_i$ considered.

This step then makes it possible to pass from a characterization of each section by attributes, to a characterization by energy cost.

Figure 5:
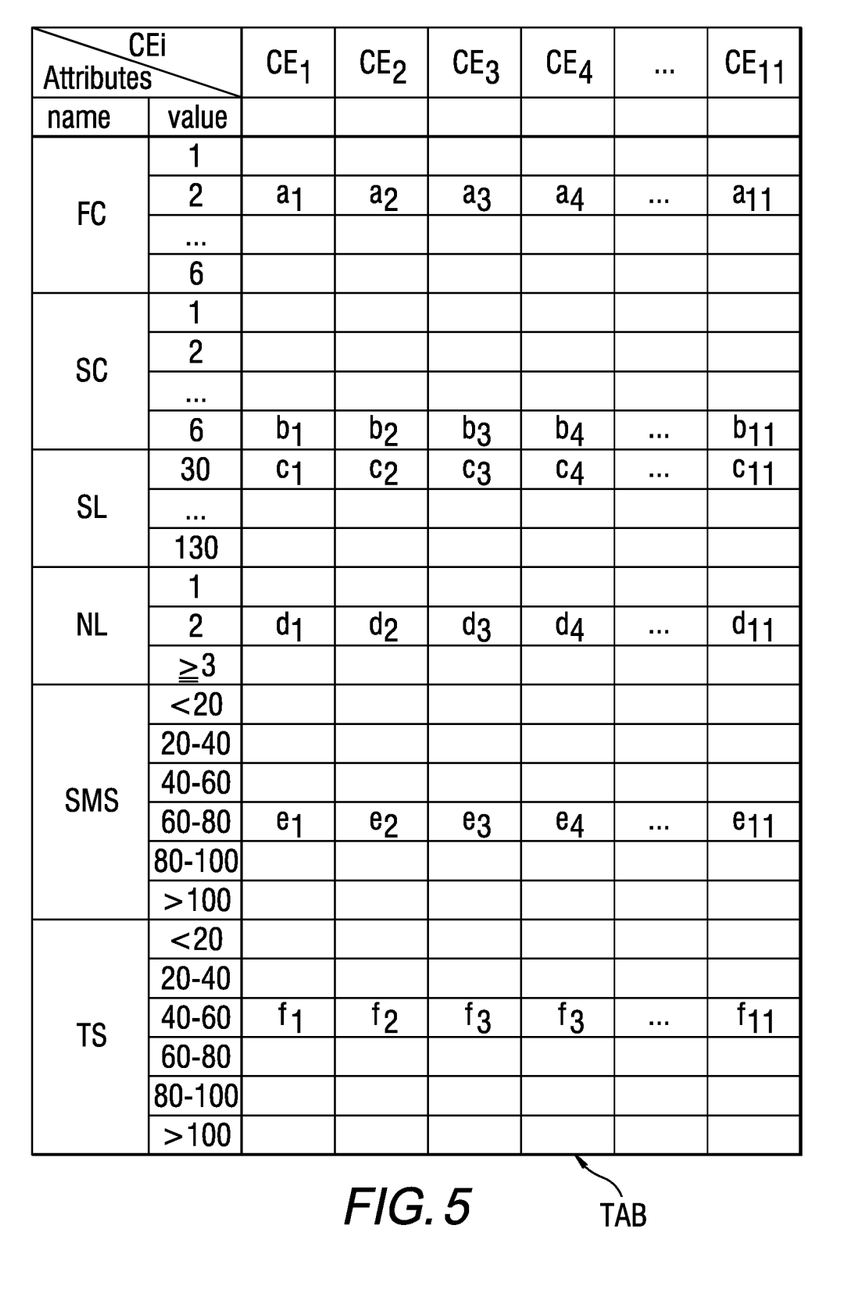
FIG. 5 is a table associating with each attribute value assigned to a section, a probability that this section is associated with one or other of the reference curves in FIG. 4.

In the course of this fourth step, the computer will use the table TAB illustrated in FIG. 5, which is recorded in its memory.

As shown in this FIG. 5, this table TAB depicts lines that each correspond to a value (or to a range of values) of an attribute. It depicts columns each corresponding to one of the reference curves $CE_j$. In the illustrated example, it is considered that the computer's memory stores M reference curves $CE_j$, with M equal to eleven here.

In FIG. 5, the boxes of the table TAB are left empty since the values that they comprise will depend on the vehicle's characteristics.

In practice, this table TAB will be stored in the computers memory with values in each of these boxes.

These values will be probability values (between 0 and 1) corresponding to the probability that each attribute value corresponds to one or other of the reference curves $CE_j$.

By way of example, if the highway category FC of a section $T_i$ has a value equal to 2, it may be read in the table that the probability that this section is well characterized in terms of energy cost by the reference curve CE1 will be equal to $a_1$, that the probability that this section is well characterized in terms of energy cost by the reference curve CE2 will be equal to $a_2$, etc.

It should be noted that the gradient RG and length LL values have not been, by design, used in this table TAB.

At this stage, the computer may then read off each probability value corresponding to the value of each attribute of the section $T_i$ considered.

In the illustrated example, where it is considered that the attribute FC is equal to 2, that the attribute SC is equal to 6, that the attribute SL is equal to 30, that the attribute NL is equal to 2, that the attribute SMS is between 60 and 80 and that the attribute TS is between 40 and 60, the computer reads off the values denoted by $a_1$ to $a_{11}$, $b_1$ to $b_{11}$, $c_1$ to $c_{11}$, $d_1$ to $d_{11}$, $e_1$ to $e_{11}$, and $f_1$ to $f_{11}$.

The computer then sums up the probabilities that the section $T_i$ considered is well characterized in terms of energy cost by each of the eleven reference curves $CE_j$.

In the illustrated example, the computer accordingly sums up the values denoted by $a_1$ to $f_1$, then $a_2$ to $f_2$, etc.

Finally, the computer determines which of the eleven sums gives the highest result.

Then, it considers that the reference curve $CE_j$ with which this high probability sum is associated is that which best characterizes the section $T_i$ in terms of energy cost.

The computer may then acquire in its memory the values of the parameters characterizing this reference curve $CE_j$.

At this stage of the disclosure, the focus is more specifically on the way in which these reference curves are obtained and modeled.

For each vehicle model (or for each engine/motor model, or for each set of automobile models, or for each set of engine/motor models), it is necessary to carry out a large number of test runs (or simulation of test runs) on different geolocalized sections of highway.

These test runs make it possible to determine the fuel consumption and electricity consumption of the vehicle over different sections, the attributes of which are known. For this, the vehicle is driven multiple times over each section each time increasing the share of the traction developed by the electric motor.

It is then possible to generate a specific consumption curve CCS for each section. These specific consumption curves are the type of curves illustrated in FIG. 4.

Figure 4:
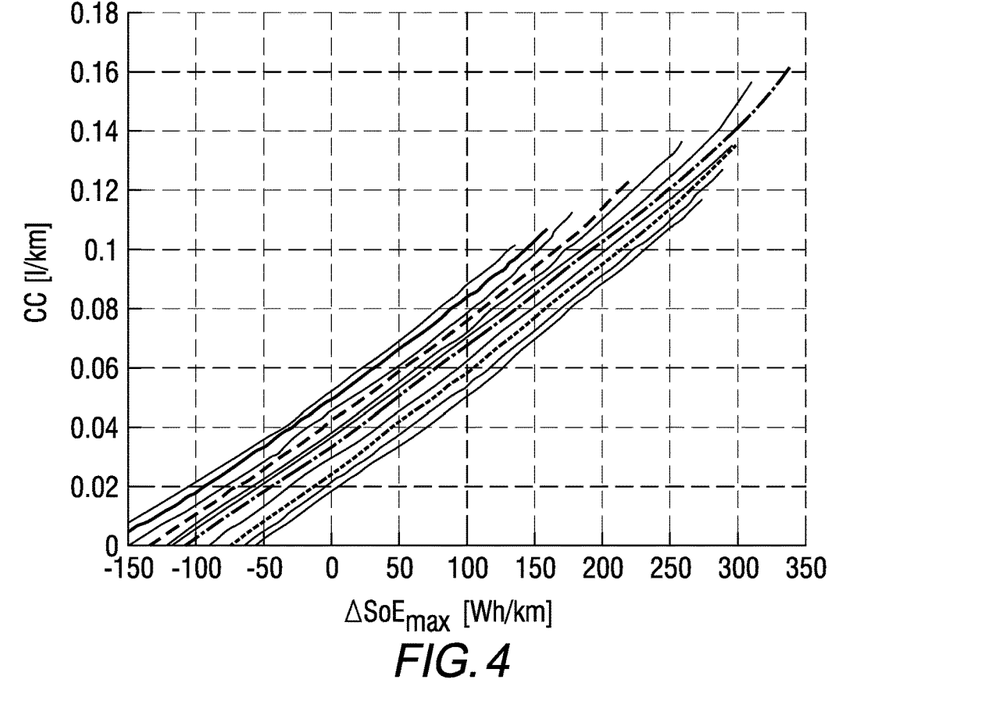
FIG. 4 is a graph illustrating multiple reference curves.

It may be observed on each of these curves that the more electrical energy is used (i.e., a $\Delta SoE<0$) the more the fuel consumption drops until it reaches 0 during a run using the electric drivetrain exclusively. Conversely, the more it is sought to recharge the battery via the combustion engine ($\Delta SoE>0$) the more the fuel consumption increases. Finally, it will be recalled that each specific consumption curve CCS describes the mean energy consumption of the vehicle for the situation of a horizontal highway run (zero gradient) without electricity consumption by the auxiliary devices.

These test runs make it possible to find as many specific consumption curves CCS as there are tested sections.

Each specific consumption curve CCS may be modeled by a second order polynomial for which the variations in charge and discharge $\Delta SOE$ of the traction battery are bounded between a minimum threshold $\Delta SOE_{min}$ and a maximum threshold $\Delta SOE_{max}$, which may be written:

$$\begin{cases} m_{FC} = \Psi_2 \cdot \Delta SoE^2 + \Psi_1 \cdot \Delta SoE + \Psi_0 \\ \Delta SoE \in [\Delta SoEmin \quad \Delta SoEmax] \end{cases}$$

with $\Psi_0$, $\Psi_1$, $\Psi_2$ the coefficients of the polynomial.

As the curves in FIG. 4 show, in order to simplify this model, it may be estimated that the two coefficients $\Psi_1$, $\Psi_2$ are identical from one curve to another. It may also be observed that the minimum threshold $\Delta SOE_{min}$ depends on the three coefficients of the polynomial. Thus, only the coefficient $\Psi_0$ and the maximum threshold $\Delta SOE_{max}$ vary. It is therefore these two values that make it possible to characterize each specific consumption curve CCS.

Figure 3:
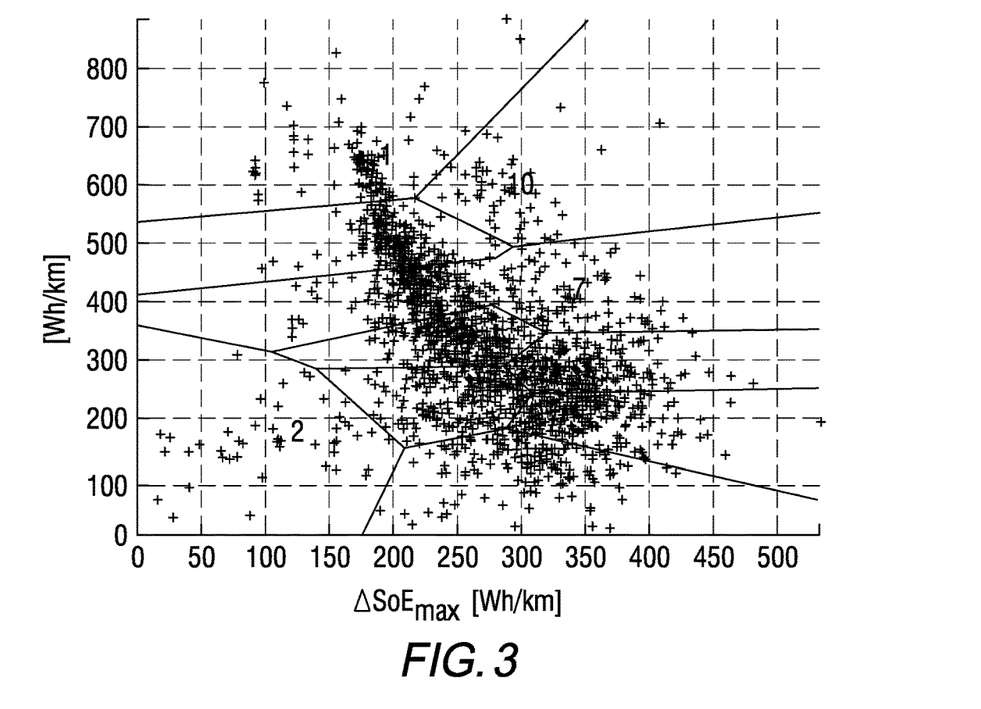
FIG. 3 is a graph illustrating the distribution of specific consumption curves acquired during test runs.

FIG. 3 then illustrates points the coordinates of which correspond to these two variables $\Psi_0$ and $\Delta SOE_{max}$. It shows the distribution of the specific consumption curves CCS obtained during conducted test runs. Here, it is considered that these points are distributed in eleven distinct areas. Each area is then defined by its barycenter.

Thus, as has been disclosed above, in the method, it is not the specific consumption curve that would exactly correspond to the section considered that is acquired, but rather it is one of the eleven reference curves, the variables $\Psi_0$ and $\Delta SOE_{max}$ of which correspond to the barycenter of one of these eleven areas, that is considered.

Figure 2:
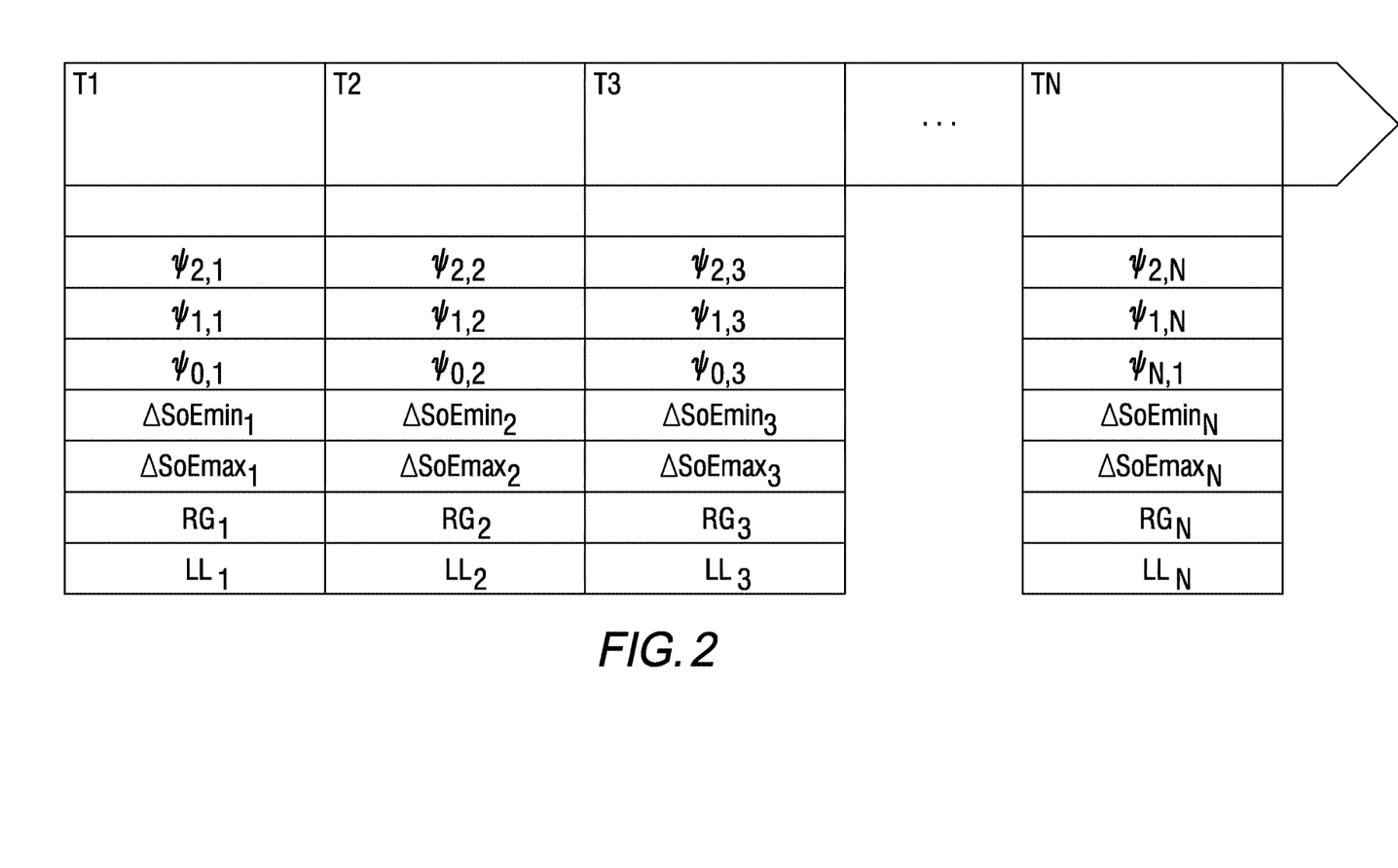
FIG. 2 is a table illustrating the parameters of reference curves characterizing the sections of the journey to be made.

At this stage of the method, each section $T_i$ is then defined as shown in FIG. 2 by the aforementioned parameters $\Psi_0$, $\Psi_1$, $\Psi_2$, $\Delta SOE_{min}$, $\Delta SOE_{max}$, and by the length $LL_i$ of each section $T_i$ and by its gradient $RG_i$.

As explained above, the selected energy curve $CE_i$ does not take into account either the gradient of the section $T_i$ or the electricity consumption of the auxiliary devices (air conditioning motor, etc.).

In order to take into account the gradient of each section $T_i$ a correction step is provided for correcting each reference curve $CE_i$ according to the gradient $RG_i$.

Figure 7:
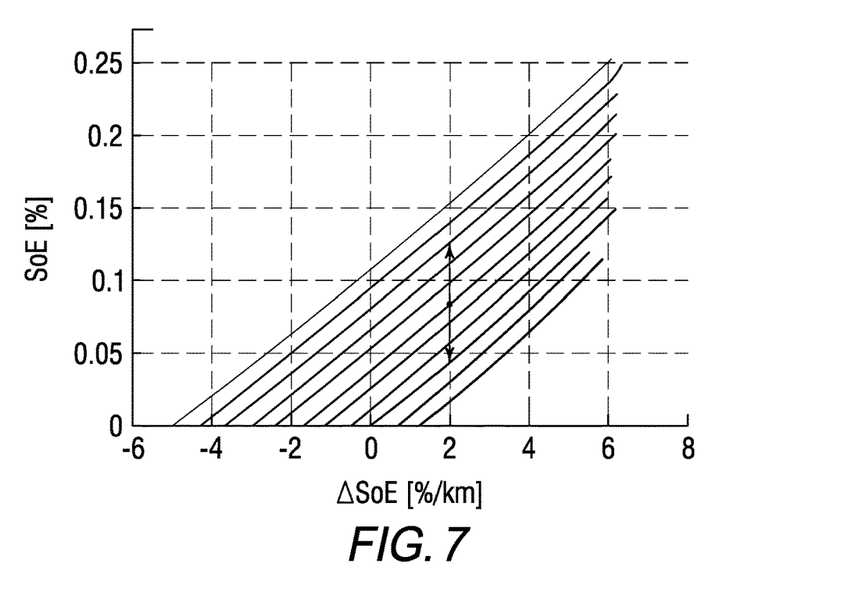
FIG. 7 is a graph illustrating the corrections to be made to a reference curve, taking into account the gradient of the section of the corresponding journey.

As clearly shown in FIG. 7, this correction step simply consists in shifting the reference curve $CE_i$ associated with the section $T_i$ upward or downward (i.e., with a constant charge or discharge $\Delta SOE$), by a value according to the gradient $RG_i$.

It will be understood indeed that when the section of highway considered climbs uphill, fuel consumption will be higher than initially expected. Conversely, when the section of highway considered goes downhill, the fuel consumption will be lower than initially expected.

In addition, during braking phases, it will be possible to recover more electricity downhill than uphill.

In practice, the correction step will consist in correcting the parameter $\Psi_0$ according to the following formula:

$$\Psi_0' = \Psi_0 + K \cdot RGi,$$

with K a coefficient in the value depending on the vehicle model considered and its characteristics (by way of example, $K=0.01327 \text{ l} \cdot \text{km}^{-1}$ may be considered here).

In order to take into account the electricity consumption of the auxiliary devices, a second correction step is provided for correcting each reference curve $CE_i$ according to the electrical power $P_{aux}$ consumed by these auxiliary devices.

Here it should be noted that the electrical power value $P_{aux}$ considered is the value that can be measured at the time of the calculations. In this method, the assumption is therefore made that the electrical power consumed will remain substantially constant during the journey. If ever the computer were to detect a large variation in this electrical power over a significant duration (e.g. because the air conditioning is switched on), it could be programmed to restart the method at this step in order to take into account the new electrical power value $P_{aux}$.

More precisely, the method could be reinitialized to this second correction step if the difference between the electrical power considered in the calculations and that measured had to remain above a threshold (e.g. 10%) over a duration above a threshold (e.g. 5 minutes).

Figure 6:
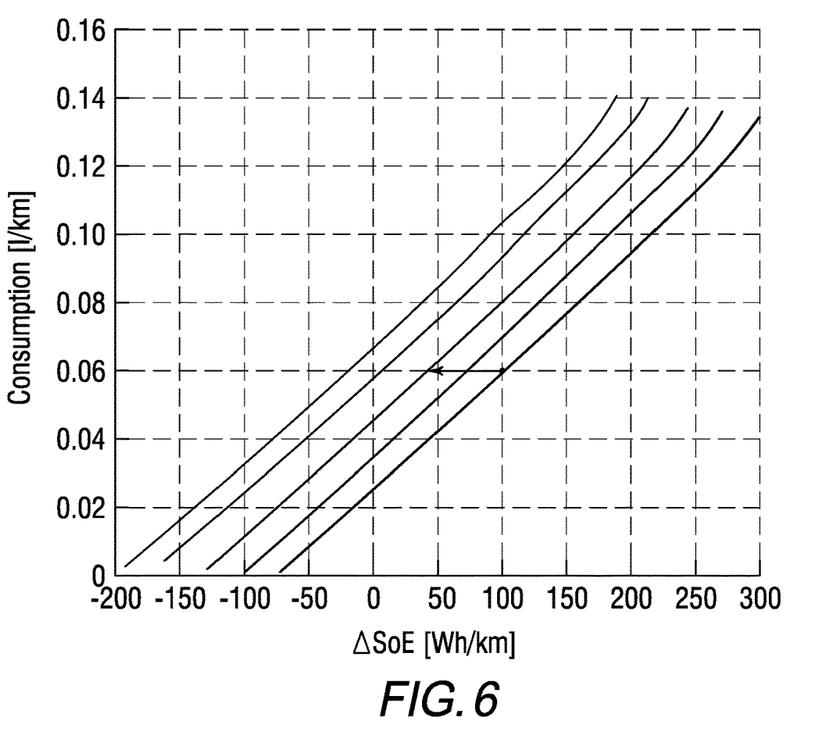
FIG. 6 is a graph illustrating the corrections to be made to a reference curve, taking into account the electricity consumption of auxiliary devices of the vehicle.

As clearly shown in FIG. 6, the second correction step simply consists in shifting the reference curve $CE_i$ associated with the section $T_i$ to the left (i.e., at a constant fuel consumption), by a value according to the electrical power $P_{aux}$.

It will be understood indeed that when the electrical devices are used, the battery charge will be slower than expected and the discharge of this battery will be faster than expected.

In practice, the correction step will consist in shifting the reference curve $CE_j$ by a value $E_{AUX}$ calculated from the following formula:

$$E_{AUX} = \frac{P_{AUX}}{\overline{v}}$$

where $\overline{v}$ represents the mean speed over the section (in kph). This value may be supplied directly by the geolocation and navigation system, by estimating that it will be equal to the value of the traffic speed or to the statistical mean speed or to the speed limit.

The fifth step of the method then consists in determining, on each reference curve $CE_j$ the optimal point $P_i$ for minimizing the fuel consumption of the hybrid motor vehicle over the entire journey and obtaining a complete discharge of the traction battery at the end of said journey.

This step is performed here by means of a type A* optimization algorithm. This is an algorithm known in the prior art and therefore will not be described here in detail. However, its operation may be explained briefly.

For this, reference will be made to FIG. 8.

It is seen there that for each section, a series of crossing points is plotted by energy states SOE parallel to the ordinate axis, with an abscissa equal (in kilometers) to the distance between the departure station and the final point of the section. Each point of this line corresponds to an attainable energy state SOE deduced from the reference curve $CE_j$ associated with this section. The energy states SOE space is discretized in a finite number of points.

The ordinate of each point is then equal to the energy state SOE of the traction battery that would remain at the end of the section if the vehicle was driven according to the corresponding point of the reference curve $CE_j$, taking into account the charge or discharge applied to the traction battery.

Each point therefore constitutes a node n.

The goal of the algorithm A* is then to find the path CI that will minimize the fuel consumption of the vehicle.

The choice of the order for exploring nodes n is determined by trying to minimize a function f which is the sum of a cost function g and a heuristic function h, as shown by the following formula:

$$f(n)=g(n)+h(n)$$

where g(n) represents the quantity of fuel needed to arrive at the node n from the initial node (start of the journey) over the best available trajectory according to the choices of the charge or discharge ΔSOE to be applied to the battery over the preceding sections, and where h(n) represents an optimistic estimate of the quantity of fuel remaining to be consumed with a charge or discharge ΔSOE that could be applied to the traction battery for passing from the node n to the final node by considering the case of a linear discharge of the traction battery from the node n.

The function f allows the algorithm to explore at each calculation step the trajectory that both minimizes the cost for arriving at the current node but also minimizes the remaining cost from this node to the end of the journey.

Thus, the use of the function f encourages this algorithm to explore the nearest trajectories to the optimal trajectory, this limits the exploration of suboptimal trajectories, which enables it to obtain good results in a minimum of calculation steps.

Once the optimal path is found (passing through the optimal points of the reference curves $CE_j$), the computer develops an energy management setpoint according to the coordinates of the optimal points $P_i$.

Figure 8:
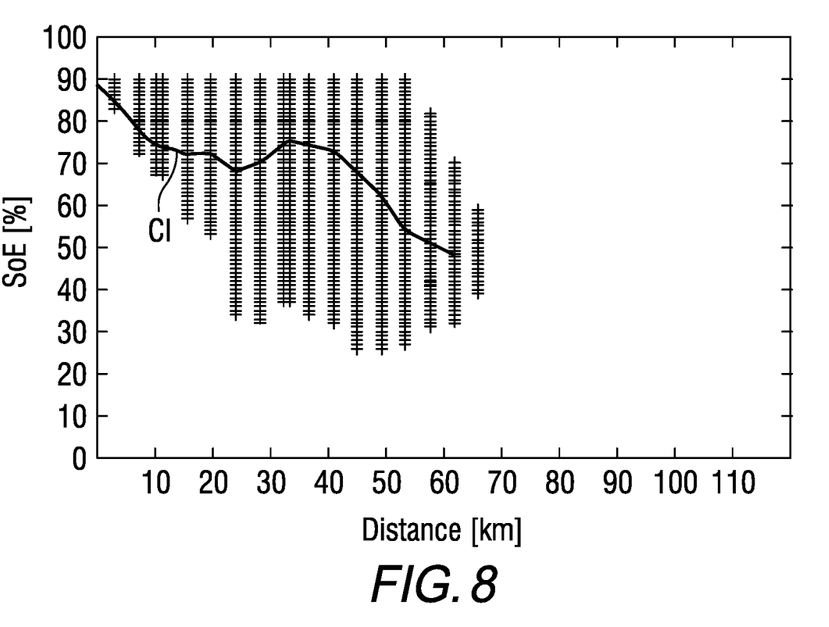
FIG. 8 is a graph illustrating different points for each reference curve associated with each section and a curve passing through the optimal points of these reference curves.

This energy management setpoint is then used in the course of the journey by the computer in order to track the trajectory, so that the state of energy SOE of the traction battery follows the path CI illustrated in FIG. 8.

A plurality of methods allow such tracking to be performed. One example is notably well illustrated in patent application FR2988674 filed by the applicant, or in documents WO2013150206 and WO2014001707.

The present invention is in no way restricted to the embodiment described and represented, but the person skilled in the art will know how to apply any variant that falls within its spirit.

In particular, instead of storing the parameters $\Psi_0$, $\Psi_1$, $\Psi_2$, $\Delta SOE_{min}$, $\Delta SOE_{max}$ of the reference curves, provision may be made for the computer to store points globally characterizing the form of each reference curve. This is then referred to as a map.

According to another variant of the invention, in the event that the geolocation and navigation system does not know the value of an attribute of a section of the journey, it may be provided that:
- either the calculation of the sums of probabilities does not take into account the values of the probabilities assigned to this attribute,
- or the calculation replaces the unknown value with a predetermined value.

The invention claimed is:

1. A calculation method for calculating a setpoint for managing fuel and electricity consumption of a hybrid motor vehicle comprising at least one electric motor supplied with electricity by a traction battery, and an internal combustion engine supplied with fuel, the calculation method comprising:
   a) acquiring, by a navigation system, a journey to be made;
   b) dividing said journey into successive sections, the dividing including selecting a length of each section of the journey as a maximum length of the journey over which a predetermined attribute is constant, the predetermined attribute being one of a gradient of the section, a speed category of the section, and a highway category of the section;
   c) acquiring, for each section, additional attributes characterizing said section;
   d) selecting, for each of said sections and taking into account the predetermined attributes and additional attributes, from among a plurality of predetermined relationships linking fuel consumption values to electrical energy consumption values, a relationship linking the fuel consumption of the hybrid motor vehicle over the section to the electrical energy consumption;
   e) determining an optimal point of consumption in each of the selected relationships such that the set of optimal points minimize the fuel consumption of the hybrid motor vehicle over the entire journey and maximize the discharge of the traction battery at an end of said journey;
   f) developing an energy management setpoint throughout the journey, according to coordinates of said optimal points; and
   wherein, prior to step b), dividing the journey into a plurality of adjacent segments, and each of the segments corresponds to a part of the journey that extends between two highway intersections, and
   wherein the journey is re-divided in step b) such that segments in which the predetermined attribute is identical are combined into the same section.

2. The calculation method as claimed in claim 1, in which the predetermined relationships are curves or maps linking fuel consumption values of the internal combustion engine to charge or discharge values of the traction battery.

3. The calculation method as claimed in claim 1, in which, in step d), the relationship is selected regardless of a gradient of said section, and in which, prior to step e), provision is made for a correction step d1) for correcting said relationship taking into account said gradient.

4. The calculation method as claimed in claim 3, in which said correction step d1) includes shifting each point of the relationship so as to modify, at a constant charge or discharge value, the fuel consumption by a value according to the gradient.

5. The calculation method as claimed in claim 1, in which, in step d), the relationship is selected regardless of the electricity consumption of auxiliary devices which are separate from the electric motor and which are powered by the traction battery, and in which, prior to step e), provision is made for a correction step d2) for correcting said relationship taking into account said electricity consumption of the auxiliary devices.

6. The calculation method as claimed in claim 5, in which said correction step d2) consists in shifting each point of the relationship so as to modify, at a constant fuel consumption value, the charge or discharge by a value according to said electricity consumption of the auxiliary devices.

7. The calculation method as claimed in claim 6, in which steps d)-f) are repeated when the electricity consumption of the auxiliary devices varies substantially during the journey.

8. The calculation method as claimed in claim 1, further comprising:
storing in a memory the predetermined relationships and a table associating with each value of the predetermined attributes and additional attributes a probability that the section is associated with one of the predetermined relationships,
in which, in step d), provision is made for each section:
to determine, based on said table, taking into account the values of the predetermined attributes and additional attributes associated with the section, a sum of the probabilities that the section belongs to one of the predetermined relationships, and
to select the relationship having a highest probability sum.

9. The calculation method as claimed in claim 1, in which the predetermined relationships are curves and each of the curves is defined as a second order polynomial, for which the variations in charge and discharge of the traction battery are bounded between a minimum threshold and a maximum threshold.

10. The calculation method as claimed in claim 9, in which said polynomial has two invariable coefficients.

11. The calculation method as claimed in claim 1, in which, in step e), the optimal consumption point of the relationship associated with each section is determined by means of an optimization algorithm.

12. The calculation method as claimed in claim 1, in which the length of each section is selected such that the gradient of the section, the speed limit of the section, and the highway category of the section are all constant over the length.

13. The calculation method as claimed in claim 1, in which the additional attributes include a speed limit of the section, a mean speed of the section, an instantaneous speed of the section, a length of the section, a mean radius of curvature of the section, and a number of lanes of the section.

* * * * *